(12) United States Patent
Ryan et al.

(10) Patent No.: US 9,390,092 B2
(45) Date of Patent: Jul. 12, 2016

(54) VISUALIZATION OF CALENDAR SEARCH ENTRIES

(75) Inventors: Corinne M. Ryan, Westford, MA (US); Fang Lu, Billerica, MA (US); Weichuan Dong, Lowell, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 1995 days.

(21) Appl. No.: 11/565,132

(22) Filed: Nov. 30, 2006

(65) Prior Publication Data
US 2008/0133524 A1 Jun. 5, 2008

(51) Int. Cl.
*G06F 3/048* (2013.01)
*G06F 17/30* (2006.01)
*G06Q 10/10* (2012.01)

(52) U.S. Cl.
CPC ...... *G06F 17/30029* (2013.01); *G06F 17/3005* (2013.01); *G06Q 10/109* (2013.01)

(58) Field of Classification Search
CPC .......... G06F 17/30029; G06F 17/3005; G06Q 10/109
See application file for complete search history.

(56) References Cited

U.S. PATENT DOCUMENTS

| 6,480,830 | B1 | 11/2002 | Ford et al. | |
|---|---|---|---|---|
| 7,505,998 | B2 * | 3/2009 | Barrett | |
| 7,509,518 | B2 * | 3/2009 | Bailey et al. | 714/1 |
| 2002/0174089 | A1 * | 11/2002 | Tenorio | 707/1 |
| 2006/0047644 | A1 | 3/2006 | Bocking et al. | |
| 2006/0095853 | A1 * | 5/2006 | Amyot et al. | 715/744 |
| 2006/0200841 | A1 * | 9/2006 | Ramaswamy | H04H 60/33 725/1 |
| 2007/0005548 | A1 * | 1/2007 | Kelly | 707/1 |
| 2007/0282947 | A1 * | 12/2007 | Hupfer | G06Q 10/10 709/204 |
| 2008/0114809 | A1 * | 5/2008 | MacBeth et al. | 707/104.1 |

FOREIGN PATENT DOCUMENTS

EP 1338960 A2 8/2003

OTHER PUBLICATIONS

"Classroom Bridge: using collaborative public and desktop timeline to support activity awareness", by Craig Ganoe et al, 2003, vol. 5, Issue 2, 21-30 , http://delivery.acm.org/10.1145/970000/964699/p21-ganoe.pdf?key1=964699&key2=5258596921&coll=DL &dl=ACM&CFID=7968452&CFTOKEN=61616584.*
"Visual Query of Multdimensional Temporal Data", Jerry Fails et al. , 1-11, http://www.cs.umd.edu/class/spring2005/cmsc838s/assignment-projects/visual-query-of-temporal-data/Final-Paper-06.pdf.*
"Special Edition Using Microsoft Office Outlook, 2003, 997 pages,Patrica Cardoza", http://academic.safaribooksonline.com/book/office-and-productivity-applications/0789729563/working-with-tasks/ch14lev1sec5.*

* cited by examiner

*Primary Examiner* — Tarek Chbouki
(74) *Attorney, Agent, or Firm* — Steven M. Greenberg, Esq.; CRGO Law

(57) ABSTRACT

Embodiments of the present invention provide a method, system and computer program product for the visualization of calendar search results. A calendar search results visualization method can include obtaining search results for a search against a data store of calendar events, selecting a sorting attribute for the search results such as a user attribute or event type attribute, counting how often the sorting attribute can be found in an event among the search results, and sorting the search results according to the count. The method also can include rendering the sorted search results in a visualization user interface organized in tabular format of events by date, in which each event is represented in the visualization user interface by an iconic representation that can vary in size according to a number of participants to a corresponding event or according to a completion status for tasks assigned during a corresponding event.

12 Claims, 2 Drawing Sheets

VISUALIZATION OF CALENDAR SEARCH ENTRIES

BACKGROUND OF THE INVENTION

1. Field of the Invention

The present invention relates to the field of computer based calendaring and scheduling and more particularly to visualizing search results in a calendaring and scheduling system.

2. Description of the Related Art

Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Several software products include support for Calendaring & Scheduling (C&S). Known C&S products include Lotus Notes, Microsoft Outlook, and web-based products like Yahoo! Calendar. These products allow one to manage personal events including appointments and anniversaries. C&S products also typically allow one to manage shared events, referred to generally as meetings.

As calendars become populated with calendar entries, it can become challenging for end users to locate specific events. Consequently, most C&S products provide a searching mechanism with which events can be located corresponding to one or more search terms. The event searching mechanism generally permits a keyword searching of one or more structured fields for a calendar event, such as the subject, organizer or invitees. In response to a search query, the result set is provided in a list format permitting sorting by different field. To the extent that the list is extensive, locating a desired record can be challenging. Moreover, the simplistic list format of the search results does not facilitate the extraction of real meaning from the search results.

Advanced C&S systems recognize the importance of extracting meaning from search results for events in a calendar. To that end, at least one well-known C&S system provides a facility for exporting search results into a third-party drawing program. The third-party drawing program can receive the search results and generate a graphical chart of the results. Based upon the graphical chart, the search results can be "visualized" in order to extract meaning from the search results. Of course, coordinating the manual interactions of two separate software packages in order to achieve search results visualization can be error prone and tedious at best.

BRIEF SUMMARY OF THE INVENTION

Embodiments of the present invention address deficiencies of the art in respect to calendar searching in a C&S system and provide a method, system and computer program product for the visualization of calendar search results. In one embodiment of the invention, a calendar search results visualization method can include obtaining search results for a search against a data store of calendar events, selecting a sorting attribute for the search results such as a user attribute or event type attribute, counting how often the sorting attribute can be found in an event among the search results, and sorting the search results according to the count. The method also can include rendering the sorted search results in a visualization user interface organized in tabular format of events by date, in which each event is represented in the visualization user interface by an iconic representation that can vary in size according to a number of participants to a corresponding event or according to a completion status for tasks assigned during a corresponding event.

In another embodiment of the invention, a C&S data processing system can be provided. The system can include a data store of calendar events for the C&S system, a search engine configured for searching the data store according to specified search terms to produce search results, and search results visualization logic. The logic can include program code enabled to select a sorting attribute for the search results, count how often the sorting attribute can be found in an event among the search results, and sort the search results according to the count. The system also can include a search results visualization user interface including a key of selectable sorting attributes. In one aspect of the embodiment, the user interface can include a tabular format of events by date, each of the events having an iconic representation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for visualizing calendar search results in a C&S system. In accordance with an embodiment of the present invention, search results for a calendar search query can be presented in a search user interface. Subsequently, a visualization user interface can be provided in which the search results can be organized according to a selection of one or more sorting attributes. In particular, the visualization user interface can include a table of events to event dates. An iconic representation of a type of event further can be provided in the table to provide a third dimension of visualization. Elements placed within the iconic representation as well as the size and border of the iconic representation can provide fourth and fifth dimensions of visualization of the search results.

Figure 1:
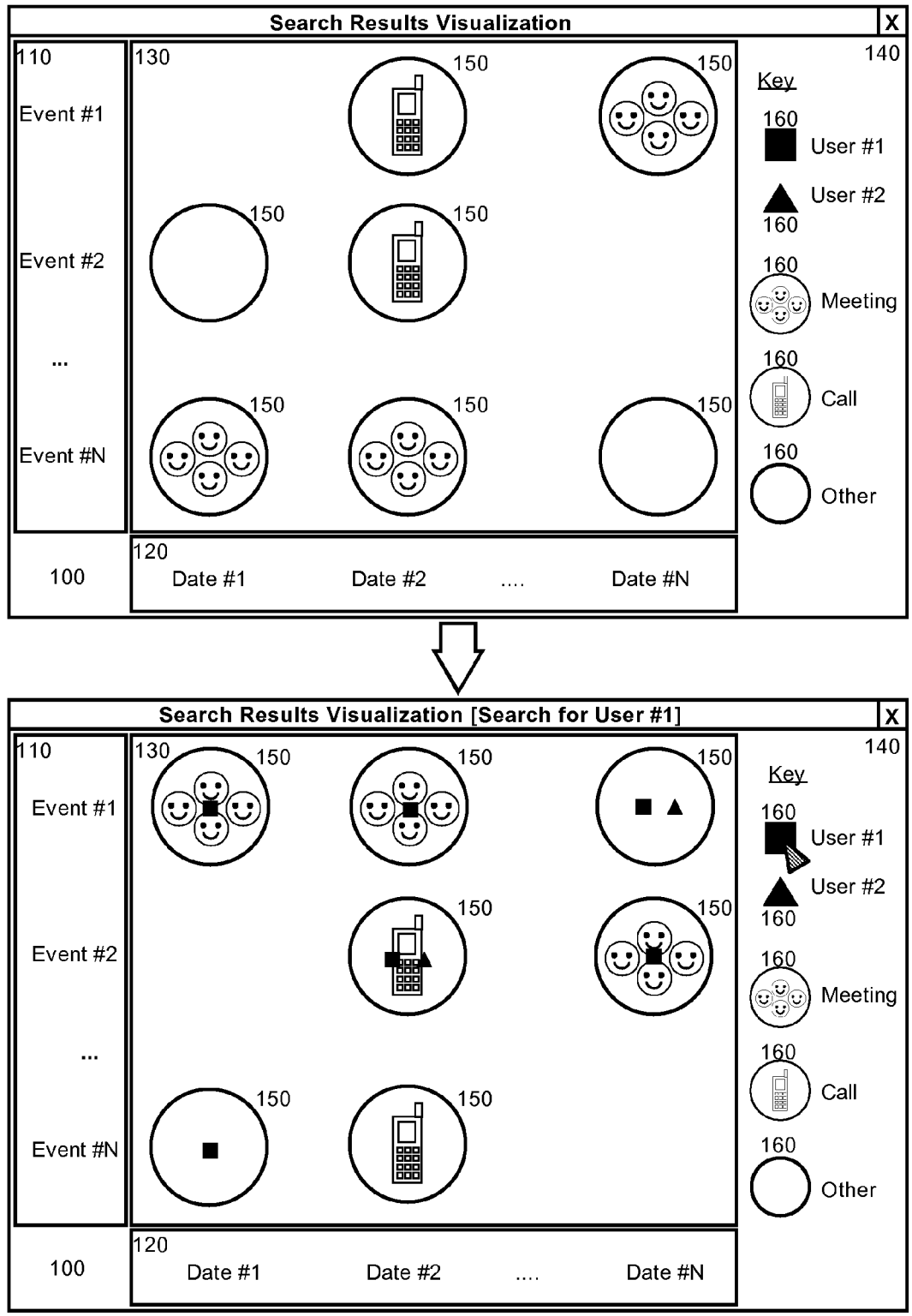
FIG. 1 is a pictorial illustration of a process for visualizing calendar search results in a C&S system.

In illustration, FIG. 1 pictorially depicts a process for visualizing calendar search results in a C&S system. As shown in FIG. 1, search results produced by a search query against a data store of calendared events can result in a selection of events 150 scheduled at different times. The search query can include, by way of example, a simple string search for all meta-data for calendared events, and a name search for all or just selected name fields like sender, recipient, inviter and invitee. The search results can be filtered according to any criteria such as by date range, topic, or type. The result set can be displayed in a search results visualization display 100 the can include a table 130 of events 110 to event dates 120. Each of the events 150 can be classified within a key 140. For example, the events 150 individually can be a meeting, a call or some other event.

Importantly, the key 140 can provide one or more selectable attributes 160. The selected attributes 160 can include event participants, event types, event topics, and the. Responsive to the selection of one of the attributes 160, the events 150 can be sorted according to attribute. In this regard, the selected attribute can be located in different ones of the events 150. Thereafter, each row of events can be ordered according to the greatest number of events 150 in the row having the selected one of the attributes 160. Alternatively, each row of events can be ordered according to a weight applied to each row computed according to the greatest number of events 150 in the row having the selected one of the attributes 160 or by greatest frequency over a specified time period.

Notably, additional attributes 160 can be selected to further narrow the sorting criteria such as User #1 and Meeting to indicate all meetings attended by User #1. Optionally, the size of the iconic representation of the events 150 can vary according to a number of attendees to the meeting, and a color for the iconic representation of the events 150 can vary according to whether or not all assigned tasks associated with the events 150 have been completed. In this way, the search results can be visualized to provide greater understanding of the search results.

Figure 2:
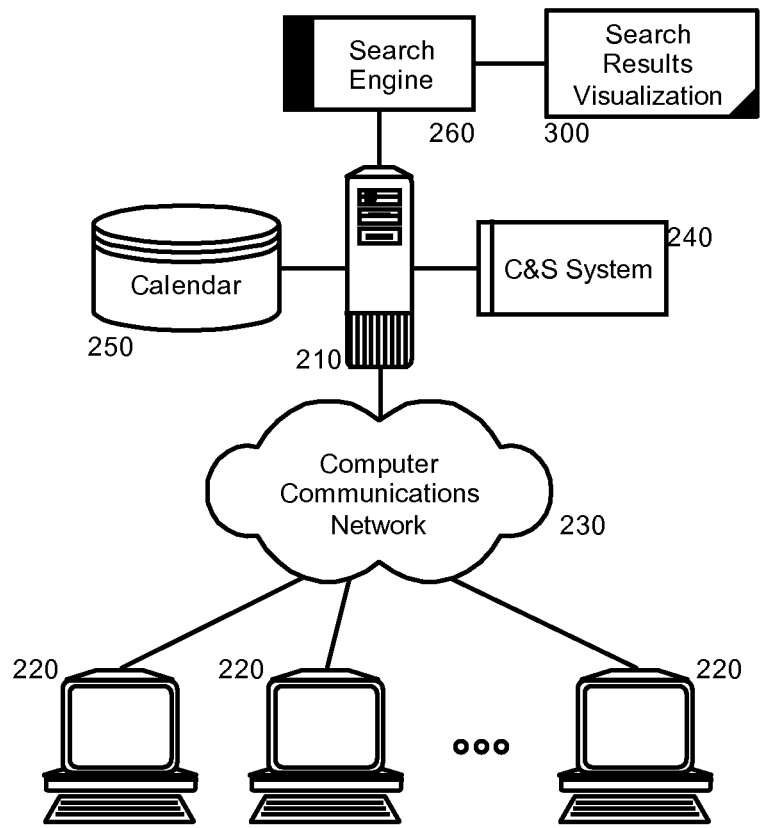
FIG. 2 is a schematic illustration of a C&S data processing system configured for search results visualization; and, FIG. 3 is a flow chart illustrating a process for search results visualization in a C&S system.

In further illustration, FIG. 2 is a schematic illustration of a C&S data processing system configured for search results visualization. The system can include a host computing platform 210 supporting the operation of a C&S system 240. A data store of calendar events 250 can be coupled to the host computing platform 210 and configured to store calendar events for the C&S system 240. The host computing platform 210 can be communicatively coupled to one or more collaborative computing clients 220 over computer communications network 230 so as to permit the collaborative computing clients 220 to access the C&S system concurrently.

A search engine 260 can be coupled to the C&S system 240 through the host computing platform 210. The search engine 260 can be configured to conduct a search of the data store of calendar events 250 and to produce a result set in consequence. The search can vary from a simple text search of all fields of all events in the data store of calendar events 250. The search can be limited to a sub-set of the events in the data store of calendar events 250, or a sub-set of fields for calendar events in the data store, or both. The search can be yet further limited to query text type, for instance query by name, topic or date.

Importantly, search results visualization logic 300 can be coupled to the search engine 260. The search results visualization logic 300 can include program code enabled to render a visualization user interface of sorted search results provided by the search engine 260. The sorted search results can be arranged in a table of events by date such that recurring events repeat over different times with an instance of the repeating event appearing at the intersection of the event and each scheduled time. The sorted search results can vary according to one or more selected sorting attributes, including user and event type. In this regard, events associated with the selected attributes can be arranged first in order, while events not associated with the selected attributes can be arranged last in order.

Optionally, the iconic representation of each event in the sorted view can vary according to event characteristic. In this regard, the size of the iconic representation of an event can increase to reflect a greater number of attendees to the event, whereas the size of the iconic representation of an event can decrease to reflect a lesser number of attendees to the event. Also, the fill color or border color of an iconic representation of an event can vary to indicate whether or not tasks associated with the event have been completed or is still pending.

Figure 3:
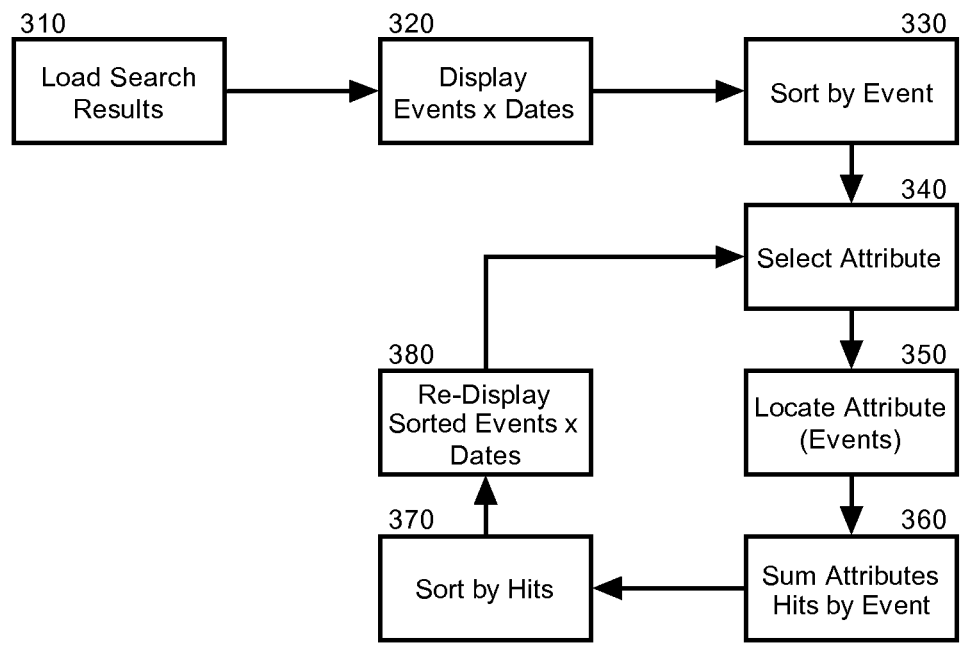

In yet further illustration, FIG. 3 is a flow chart illustrating a process for search results visualization in a C&S system. The process can begin in block 310 with the loading of search results produced in consequence of a search query of a data store of calendar events for a particular search query. In block 320, the search results can be displayed in a visualization user interface in tabular format of events by date. In block 330, the visualization user interface can be initially unsorted in order of event. Thereafter, in block 340 one or more sorting attributes can be selected through the visualization user interface.

In block 350, each event among the search results can be inspected for the presence of the selected attribute or attributes. The presence of any one attribute can be considered a "hit" and the number of hits for an event can be summed in block 360. Thereafter, in block 370, the search results can be sorted within the visualization user interface according to the number of hits summed for the events. Events having a greater number of hits will be placed higher in the sort ordering than events having a lower number of hits. Finally, in block 380, the events in the visualization user interface can be re-displayed to reflect the new sort ordering. This process can repeat for repeated selections of different attributes.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A calendar search results visualization method comprising:
    obtaining search results for a search against a data store of calendar events;
    selecting a sorting attribute for the search results;
    counting how often the sorting attribute can be found in an event among the search results;
    sorting the search results according to the count;
    rendering the sorted search results in a visualization user interface organized in tabular format of events by date, each event represented in the visualization user interface by an iconic representation;
    varying a color of at least a portion the iconic representation according to a completion status for tasks assigned during a corresponding event; and,
    varying a size of the iconic representation according to a number of participants to a corresponding event.

2. The method of claim 1, wherein obtaining search results for a search against a data store of calendar events, comprises:
    composing a search query against the data store of calendar events;
    filtering the search query to exclude particular ones of the calendar events; and,
    receiving the search results produced by the search query.

3. The method of claim 1, wherein selecting a sorting attribute for the search results; comprises selecting one of a user attribute and an event type attribute for sorting the search results.

4. The method of claim 1, wherein sorting the search results according to the count, comprises sorting the search results according to a weight computed from the count.

5. The method of claim 1, further comprising:
    selecting an additional sorting attribute for the search results;
    adding to the count how often the additional sorting attribute can be found in an event among the search results.

6. A calendaring and scheduling (C&S) data processing system comprising:
    a host computing system comprising at least one computer with memory and at least one processor in which the C&S system executes;
    a data store of calendar events for the C&S system;
    a search engine configured for searching the data store according to specified search terms to produce search results; and,
    search results visualization logic comprising program code enabled to select a sorting attribute for the search results, count how often the sorting attribute can be found in an event among the search results, sort the search results according to the count, render the sorted search results in a visualization user interface organized in tabular format of events by date, each event represented in the visualization user interface by an iconic representation, vary a color of at least a portion the iconic representation according to a completion status for tasks assigned during a corresponding event and vary a size of the iconic representation according to a number of participants to a corresponding event.

7. The system of claim 6, wherein the selectable sorting attributes comprise attributes selected from the group consisting of users and event types.

8. A computer program product comprising a non-transitory computer usable storage medium storing computer usable program code for calendar search results visualization, the computer program product comprising:
    computer usable program code for obtaining search results for a search against a data store of calendar events;
    computer usable program code for selecting a sorting attribute for the search results;
    computer usable program code for counting how often the sorting attribute can be found in an event among the search results;
    computer usable program code for sorting the search results according to the count;
    computer usable program code for rendering the sorted search results in a visualization user interface organized in tabular format of events by date, each event represented in the visualization user interface by an iconic representation;
    computer usable program code for varying a color of at least a portion the iconic representation according to a completion status for tasks assigned during a corresponding event; and,
    computer usable program code for varying a size of the iconic representation according to a number of participants to a corresponding event.

9. The computer program product of claim 8, wherein the computer usable program code for obtaining search results for a search against a data store of calendar events, comprises:
    computer usable program code for composing a search query against the data store of calendar events;
    computer usable program code for filtering the search query to exclude particular ones of the calendar events; and,
    computer usable program code for receiving the search results produced by the search query.

10. The computer program product of claim 8, wherein the computer usable program code for selecting a sorting attribute for the search results; comprises computer usable program code for selecting one of a user attribute and an event type for sorting the search results.

11. The computer program product of claim 8, wherein the computer usable program code for sorting the search results according to the count, comprises computer usable program code for sorting the search results according to a weight computed from the count.

12. The computer program product of claim 8, further comprising:
    computer usable program code for selecting an additional sorting attribute for the search results;
    computer usable program code for adding to the count how often the additional sorting attribute can be found in an event among the search results.

* * * * *